UNITED STATES PATENT OFFICE.

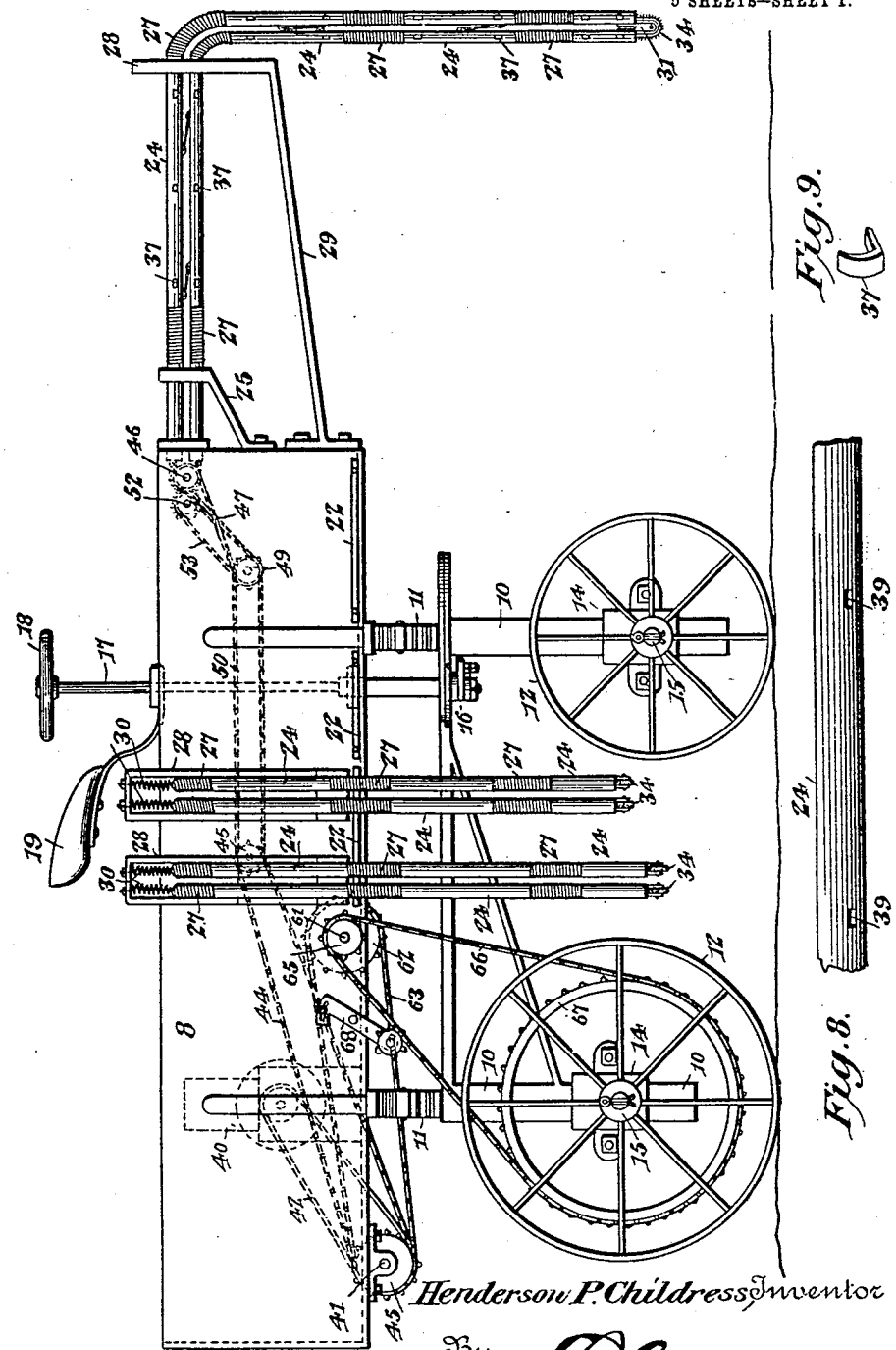

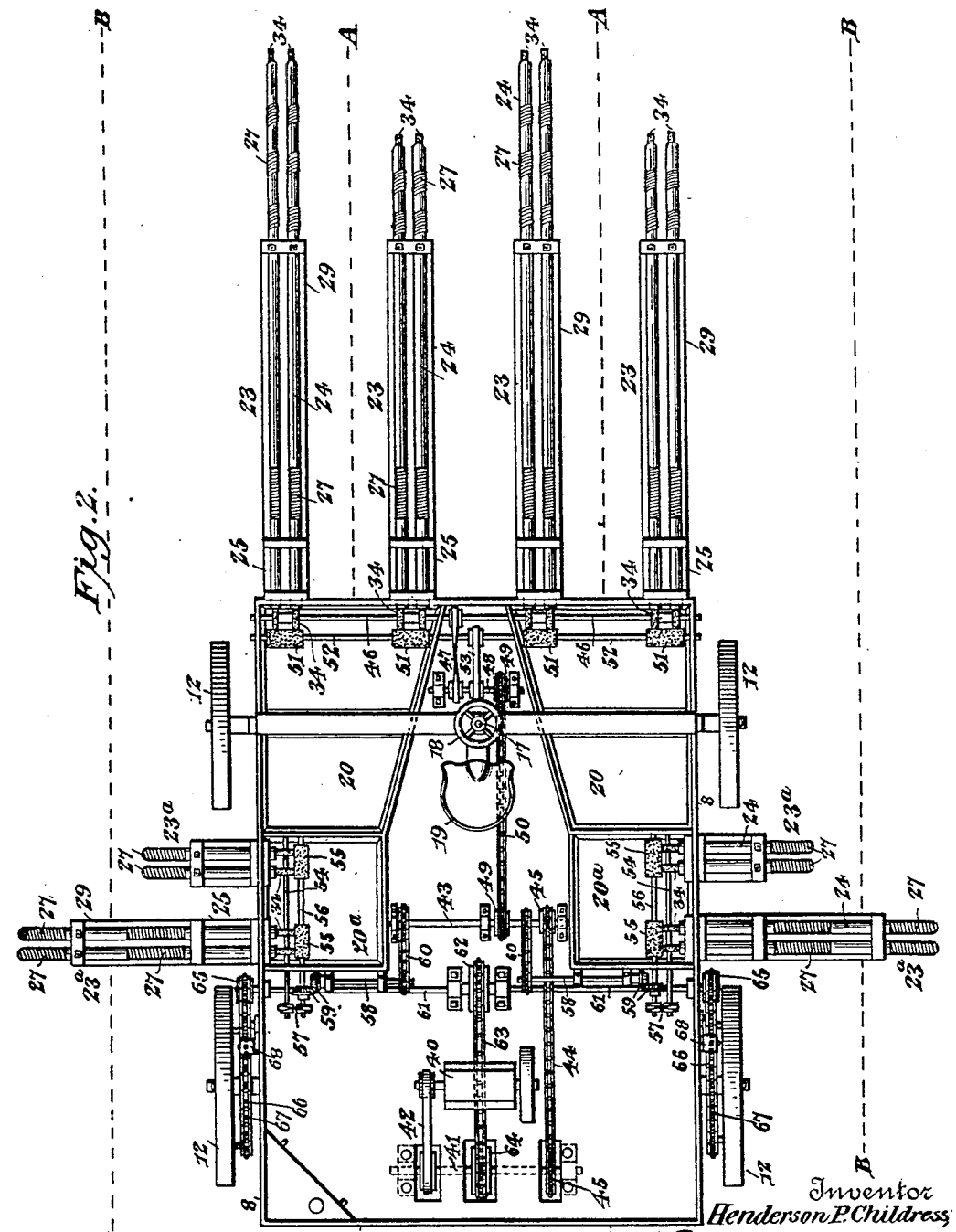

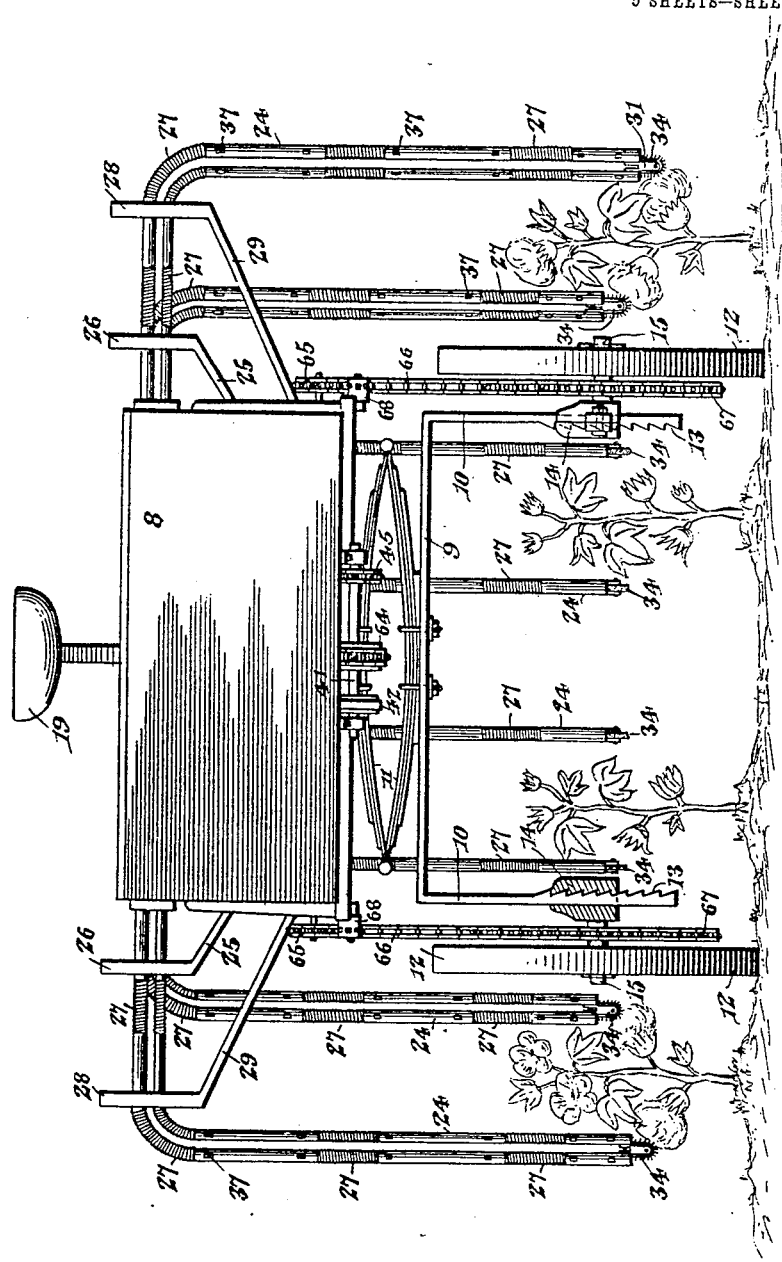

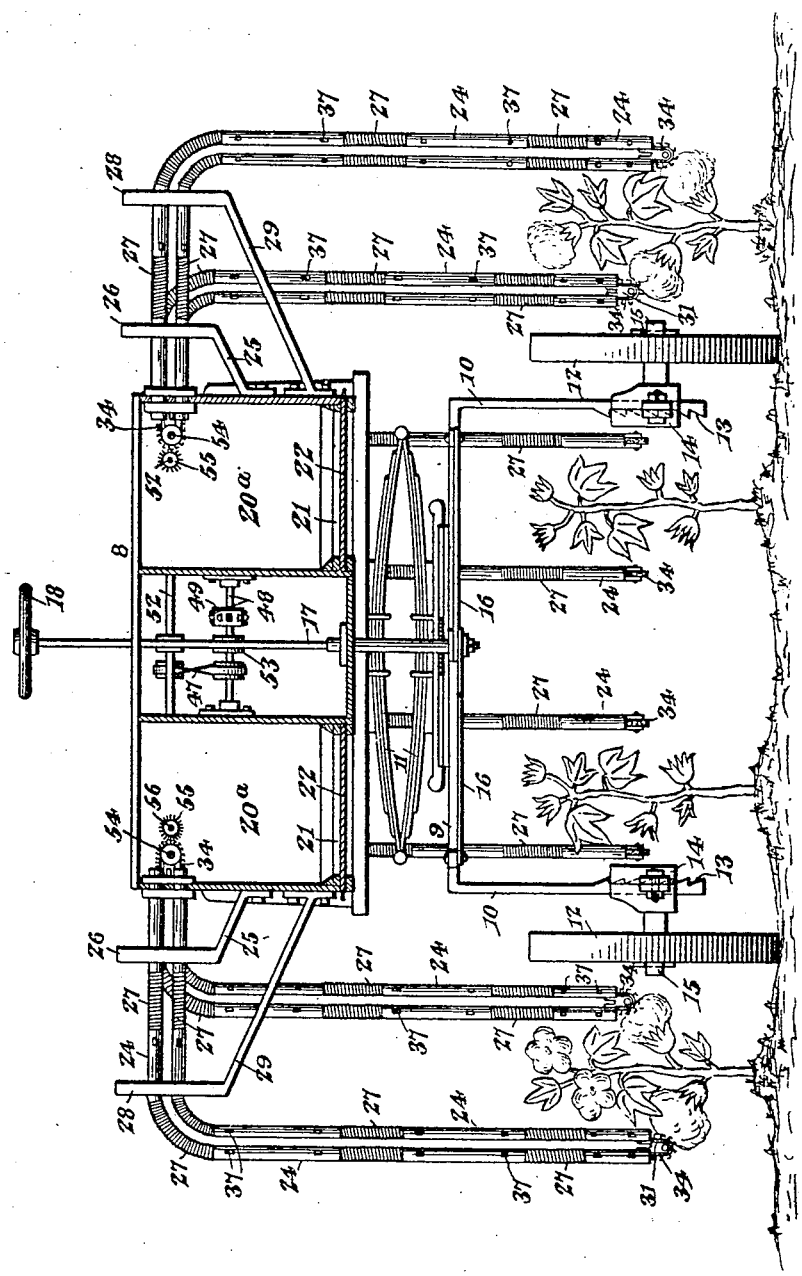

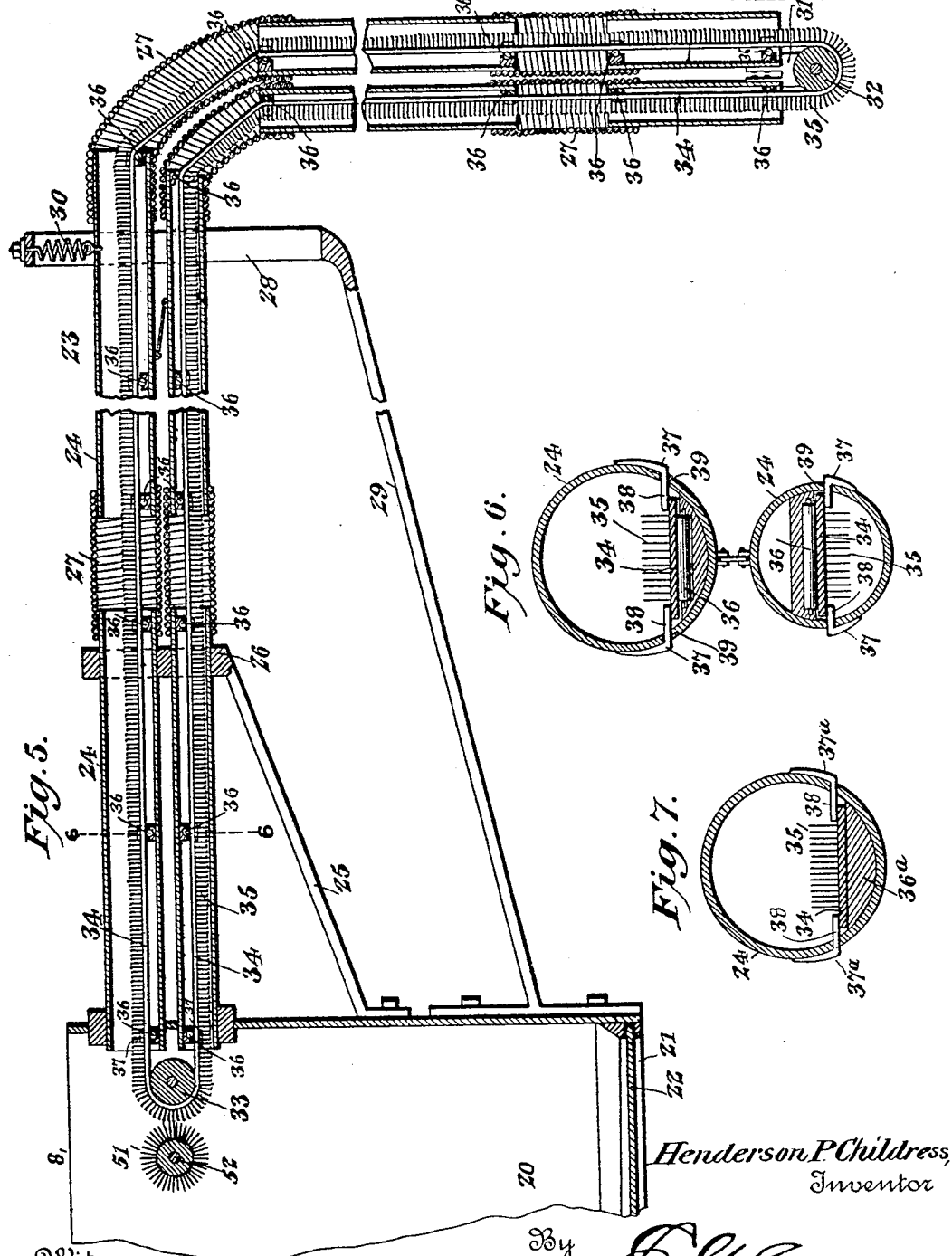

HENDERSON P. CHILDRESS, OF BROOKLYN, NEW YORK.

COTTON-PICKING MACHINE.

No. 800,629.

Specification of Letters Patent.

Patented Oct. 3, 1905.

Application filed February 4, 1905. Serial No. 244,240.

*To all whom it may concern:*

Be it known that I, HENDERSON P. CHILDRESS, a citizen of the United States, residing at Brooklyn, in the county of Kings and State of New York, have invented a new and useful Cotton-Picking Machine, of which the following is a specification.

This invention relates to improvements in mechanism for picking cotton, and has more particular reference to machines of that type wherein operators are employed for directing the picking means to the cotton-bolls.

One of the principal objects is to provide novel supporting and directing means for the cotton picking and conducting mechanisms whereby the pickers have a comparatively great range of movement with respect to the carrier or vehicle on which they are mounted.

Another object is to provide a carrier or vehicle having a body which can be adjusted to and held at different distances from the ground, and, furthermore, to provide an arrangement of parts that will permit of a comparatively great number of rows being picked simultaneously.

An embodiment of the invention that is considered preferable is shown in the accompanying drawings, wherein—

Figure 1 is a side elevation of the improved machine. Fig. 2 is a top plan view thereof. Fig. 3 is a rear elevation. Fig. 4 is a cross-sectional view. Fig. 5 is a detail sectional view, on an enlarged scale, through one of the cotton picking and conducting mechanisms.
Fig. 6 is a cross-sectional view on the line 6 6 of Fig. 5. Fig. 7 is a detail sectional view showing a slightly-modified form of guide. Fig. 8 is a detail view in elevation of one of the tube-sections. Fig. 9 is a detail perspective view of one of the guide-keepers.

Similar reference-numerals designate corresponding parts in all the figures of the drawings.

In the embodiment illustrated a vehicle or carrier is employed comprising a body 8, having arched axles 9, provided with downturned terminal legs 10, the body being preferably supported on said axles by means of springs 11. Ground-wheels 12 are employed, which wheels are vertically adjustable with relation to the body, being adjustably connected to the legs 10. The means for securing said wheels to the legs may be constructed in a variety of ways. For instance, in the embodiment illustrated said legs are provided with racks 13, that are embraced by sectional clamping-heads 14, having recesses to receive the teeth of the racks and carrying axle-stems 15, on which the wheels are journaled. The front axle is preferably made in sections, and the legs thereof are hinged, being connected by links 16 to a vertical shaft 17, having a hand-wheel 18 at its upper end, which wheel is located in advance of the operator's seat 19 and constitutes steering means for the vehicle, as will be readily understood. The said vehicle is provided with cotton-receptacles 20 and 20$^a$, which receptacles have bottom outlets 21, normally closed by slides 22.

A plurality of sets of cotton picking and conducting mechanisms carried by the vehicle deliver the picked cotton to the receptacles 20 and 20$^a$. Four of these sets (designated as a whole by the reference-numeral 23) project in advance of the vehicle, while four others (designated 23$^a$) extend beyond the sides of the same. As all of said mechanisms are similar, a description of one is thought to be sufficient, and therefore attention is invited to Fig. 5 of the drawings, wherein one of said mechanisms is shown in detail. A conduit is provided comprising sets of tubular sections 24, of light sheet metal. The inner of these sets of sections is rigidly carried by the vehicle, the inner ends of the sections thereof extending through the vehicle-walls into one of the cotton-receptacles, the outer ends being mounted in a bracket 25, secured to the vehicle and terminating in a collar 26, that surrounds said outer ends. The various sections are connected by tubular coiled springs 27, that have their ends overlapping and suitably secured to the adjacent ends of the sections, these springs thus constituting, in effect, parts of the conduit and universal joints, which will permit the relative movements of the sets of sections in any direction. The second set of sections has its outer portion extending through an upstanding yoke 28, carried by a bracket 29, secured to the vehicle, and this set of sections, and consequently the outer portion of the conduit, is yieldingly supported by a spring 30, secured to said set of sections and suspended from the upper portion of the yoke.

The outermost set of sections carries longitudinally-projecting brackets 31, in which is journaled a roller 32, and located within the cotton-receptacle in line with the inner end of the conduit is another roller 33. An endless cotton picking and conducting belt 34, having teeth 35 on one face, passes about the rollers 32 and 33 and through the conduit, the stretch of said belt that moves inward traveling through one line of sections and the return stretch operating through the other line, as will be apparent. For the purpose of properly guiding the said belts rollers 36 may be employed, which operate against the smooth side of said belt, and coacting with the opposite side of said belt are keepers 37, secured to the outer sides of the tube-sections and having inwardly-extending fingers 38 passing through openings 39 in said sections and engaging over the margins of the belt. Instead of the rollers a solid or immovable support $36^a$ may be employed, over which the belt passes, keepers $37^a$ of the same character as those above described being still employed. This slight modification is illustrated in Fig. 7. While these guiding means may be located in different positions throughout the conduit, it is desirable to have the same arranged at the ends of the tube-sections in order that when the sections are swung with respect to one another the belt will still be properly guided. In the embodiment illustrated and as shown in Figs. 2 and 4 four of these mechanisms project in advance of the vehicle and two are arranged to coact with a row of cotton, said cotton-rows being indicated by the dotted lines A A and one mechanism being disposed on each side of each row. One of the mechanisms $23^a$, located at one side of the machine, extends farther than the other, so that these mechanisms will always operate on opposite sides of a cotton-row, said rows being indicated by the dotted line B B.

A motor, preferably an explosive-engine, (conventionally shown at 40,) is employed for running the vehicle and operating the cotton-picking mechanisms. The connections between this motor and the picking mechanisms may be varied as desired. In order, however, to show an operative structure, the following system of gearing is employed. A driving-shaft 41 is operated through the medium of pulleys and belting 42 from the motor-shaft, and geared to said driving-shaft is a counter-shaft 43, the gearing consisting of a sprocket-chain 44 and sprocket-wheels 45, mounted, respectively, on said shafts. From the countershaft 43 the picking and conducting mechanisms are driven. To this end the rollers 33 are carried by a common shaft 46, journaled in the front of the body and belted, as shown at 47, to a short shaft 48, which in turn is connected, through sprocket-wheels 49 and a sprocket-chain 50, with the counter-shaft 43. Doffing-brushes 51, coacting with the picking and conducting belts 34, are carried by a common shaft 52, which shaft is also belted, as shown at 53, to the short shaft 48. The belts constituting parts of the side picking mechanisms $23^a$ pass about shafts 54, and coacting with said belts are doffing-brushes 55, these brushes being located in the rear cotton-receptacles $20^a$ and delivering cotton thereto. The brushes 55 are carried by shafts 56, and the corresponding shafts 54 and 56 are connected by belting 57. These shafts are driven from short shafts 58, having gear connections 59 with the shafts 56, the shafts 58 being in turn driven from the counter-shaft 43 by a sprocket-chain and gear connection 60.

For the purpose of driving the rear ground-wheels 12 a counter-shaft 61 is employed, journaled transversely in the vehicle and having a compensating gear 62, about which passes a sprocket-chain 63, that passes about a sprocket-wheel 64 on the driving-shaft 41. The shaft 61 extends beyond the opposite side walls of the vehicle and is provided with sprocket-wheels 65, about which pass sprocket-chains 66, that extend about the sprocket-wheels 67, carried by the vehicle-wheels. In order to allow for the vertical adjustment of the vehicle-body with respect to the wheels, suitable chain-tightening devices 68 are employed, which coact with the sprocket-chains 66.

In the embodiment of the invention hereinbefore described it will be apparent that when the motor is running the vehicle will be propelled and that the cotton picking and conducting belts will be in operation. Each operator is provided with a pair of mechanisms, each of which can be held in one hand, and because of the flexibility of the conduit the said mechanisms can be directed as desired in order to secure the cotton which is picked by the teeth of the belt and is carried by said belt to the receptacles. It will be apparent that while the machine progresses the operators can assume various relations with respect thereto and with respect to each other, though it is of course advantageous to maintain the outer portions of the conduits at an inclination to the inner portions, as is indicated in Fig. 2, in order that said conduit may be kept as straight as possible, thereby avoiding friction at the joints and the danger of the teeth scraping over the coil-spring connections. The body of the vehicle can be adjusted vertically in order to permit its free passage over plants of different heights, and in the structure shown four rows of cotton can be simultaneously picked.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what

I claim as new, and desire to secure by Letters Patent, is—

1. In a cotton-picking machine, the combination with a flexible support, of yielding means for suspending said support to permit the flexing thereof, and cotton-picking means carried by the support and flexing therewith.

2. In a cotton-picking machine, the combination with a flexible support, of yielding means for suspending said support to permit the flexing thereof, and a cotton-picking belt movably mounted on the support and flexing therewith.

3. In a cotton-picking machine, the combination with a carrier, of a manually-directed flexible support mounted on the carrier, a spring for yieldingly suspending the support from the carrier, and a cotton engaging and carrying belt movably mounted longitudinally on the support and movable therewith.

4. In a cotton-picking machine, the combination with a carrier, of cotton-picking mechanism associated therewith and comprising a flexible conduit and a picking-belt movable through the conduit, and a yielding support mounted on the carrier and connected to the conduit.

5. In a cotton-picking machine, the combination with a vehicle, of a bracket mounted on the vehicle and projecting beyond the same, cotton-picking mechanism including a flexible conduit and a belt passing through the conduit, and a spring connected to the bracket and to the conduit and constituting means for yieldingly suspending the latter therefrom.

6. In a cotton-picking machine, the combination with cotton picking and conducting means including a conduit comprising relatively movable sections and cotton engaging and carrying means movably mounted on the sections and movable therewith, of means for yieldingly supporting certain of the sections.

7. In a cotton-picking machine, the combination with cotton picking and conducting mechanism including a tube comprising relatively movable sections and cotton engaging and carrying means movably mounted on both sections and movable therewith, of a spring for yieldingly supporting certain of the sections and permitting the relative movement of said sections.

8. In a cotton-picking machine, the combination with a vehicle, of cotton picking and conducting mechanism carried thereby and including a conduit comprising relatively movable sections, a picking and conducting belt passing through the conduit, and a spring supported from the vehicle and connected to one of the sections for yieldingly supporting the same.

9. In a cotton-picking machine, the combination with a vehicle, of a bracket outstanding from the vehicle, a conduit having one end mounted on the vehicle and comprising relatively movable sections located adjacent to the bracket, a picking-belt passing through the conduit, and a spring connecting the bracket and conduit and yieldingly supporting the latter.

10. In a cotton-picking machine, the combination with a wheeled vehicle, of a plurality of brackets carried thereby, a plurality of conduits comprising relatively movable sections, the inner of said sections being rigidly carried by the vehicle, cotton picking and conducting belts passing through the conduit, means mounted on the vehicle for driving the belts, and springs connecting the brackets and conduits and constituting yielding supports for the latter.

11. In a cotton-picking machine, the combination with a flexible support, of yielding means for suspending said support to permit the flexing thereof, and cotton picking and carrying means carried by the support and flexing therewith, said means including a cotton-carrying belt.

12. In a cotton-picking machine, cotton-picking mechanism, a conduit comprising sections, spring connections between the sections, and cotton picking and conducting means associated with said sections.

13. In a cotton-picking machine, cotton-picking mechanism including a conduit comprising tubular sections, tubular spring connections between the sections, and cotton picking and conducting means associated with the conduit.

14. In a cotton-picking machine, cotton-picking mechanism including a conduit comprising tubular sections, tubular coiled springs connecting the sections, and cotton picking and conducting means including belting passing through the conduit.

15. In a cotton-picking machine, the combination with a vehicle, of conduits mounted thereon and comprising tubular sections, tubular coiled springs connecting the sections, cotton picking and conveying means including belts passing through the conduits, and means carried by the vehicle for operating the belts.

16. In a cotton-picking machine, the combination with a vehicle-body, of depending legs carried thereby, clamp-sections embracing the legs and being vertically adjustable thereon, stub-axles carried by certain of the clamp-sections, wheels journaled on the stub-axles, and cotton-picking mechanism movably mounted on the body.

17. In a cotton-picking machine, the combination with a vehicle-body, of an arched axle fixed to the body and having depending legs, wheels vertically adjustable on said legs means for securing said wheels at different positions on the legs, and cotton-picking mechanism mounted on the body.

18. In a cotton-picking machine, the combination with a conduit, of a cotton picking and carrying belt movable therein and having a cotton-engaging portion projecting beyond the same, and guiding means for the belt carried by the conduit and comprising keepers mounted on the exterior of said conduit and having terminals extending into the same and engaging over the belt.

19. In a cotton-picking machine, the combination with a vehicle-body, of a plurality of flexible supports suspended from and located in advance and on either side of the vehicle-body, a plurality of cotton engaging and carrying belts movably mounted on the supports and flexing therewith, and means mounted on the vehicle for driving the various belts.

20. In a cotton-picking machine, cotton-picking mechanism including a conduit comprising sections having universal joints, and cotton picking and conducting means passing through the conduit.

21. In a cotton-picking machine, the combination with a carrier, of a manually-directed support comprising jointed relatively movable sections movable in different directions with respect to the carrier, and cotton picking and carrying mechanism including belting movably mounted on the sections and having portions arranged on opposite sides of the joint between them.

22. In a cotton-picking machine, the combination with a carrier, of a manually-directed support movable in different directions with respect to the carrier and comprising jointed relatively movable sections, and cotton picking and carrying mechanism including a belt movable longitudinally on the sections and extending across the joint between them.

In testimony that I claim the foregoing as my own I have hereto affixed my signature in the presence of two witnesses.

HENDERSON P. CHILDRESS.

Witnesses:
 FRANK KELLY, Jr.,
 R. W. KELLY.